(No Model.)

A. C. GRIGGS.
HIGH AND LOW WATER ALARM FOR BOILERS.

No. 425,570. Patented Apr. 15, 1890.

WITNESSES:
David S. Williams
John T. Lewis

INVENTOR:
Albert C. Griggs
by his attorney
Francis T. Chambers

UNITED STATES PATENT OFFICE.

ALBERT C. GRIGGS, OF WILMINGTON, DELAWARE.

HIGH AND LOW WATER ALARM FOR BOILERS.

SPECIFICATION forming part of Letters Patent No. 425,570, dated April 15, 1890.

Application filed April 6, 1889. Serial No. 306,156. (No model.)

*To all whom it may concern:*

Be it known that I, ALBERT C. GRIGGS, of Wilmington, county of New Castle, State of Delaware, have invented a new and useful High and Low Water Alarm for Boilers, of which the following is a true and exact description, reference being had to the accompanying drawings, which form a part of this specification.

My invention relates to that class of devices by which an audible signal is given when the water in a steam-boiler is not of a proper height, and particularly to devices of this class where an electric circuit is employed in giving the signal, my object being to provide an improved device of this kind certain in operation and simple in construction.

The novel features of my device are hereinafter described in connection with the drawings, and clearly pointed out in the claim, reference being now had to the drawings which illustrate my invention in the form in which I prefer to embody it, and in which—

Figure 1:
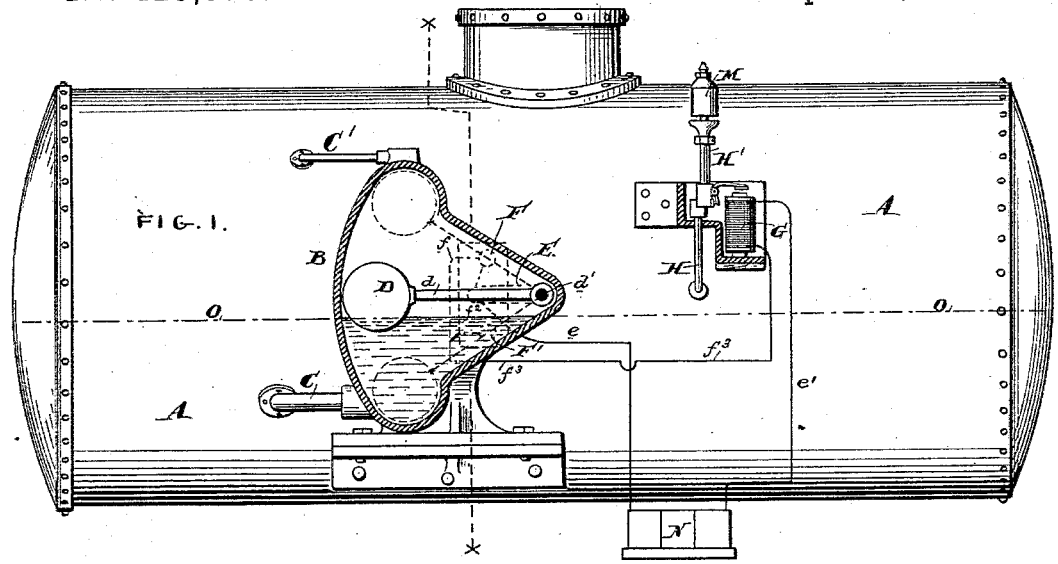
Figure 2:
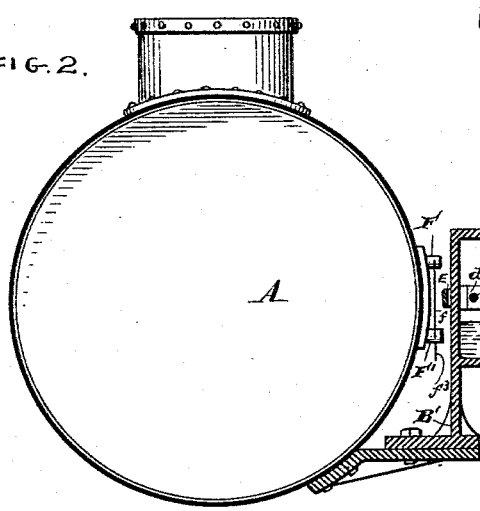
Figure 3:
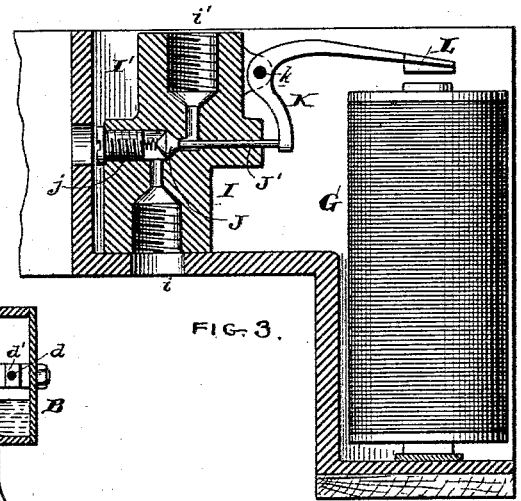
Figure 4:
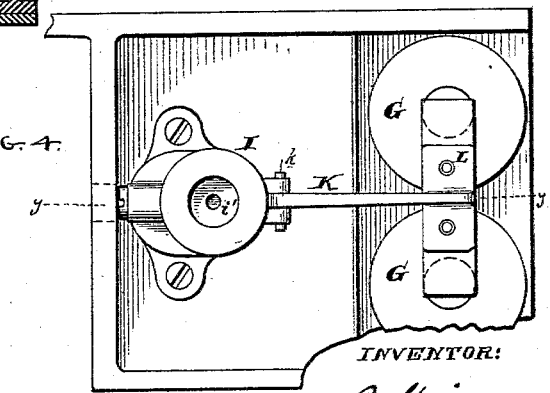

Figure 1 is a side view of my device, partly in section, attached to a boiler; Fig. 2, a cross-section on the line $xx$ of Fig. 1; Fig. 3, a view of the signal-whistle and connected electro-magnet on the section-line $yy$ of Fig 4, and Fig. 4 a plan view of the same device.

A is the boiler; B, a float-box secured so as to extend above and below the proper water-line of the boiler (indicated at O, Fig. 1) to a sufficient degree to permit a float therein to move from the level of dangerously low water to the level of dangerously high water.

C is a pipe connecting the lower part of the float-box with the water-space of the boiler, and C' a pipe connecting the upper part of the box with the steam-space. As shown, the float-box is supported by a pedestal B' attached to the boiler.

D is the float; $d$, a lever-arm to which the float is secured at one end and which at the other is secured to a shaft $d'$, which passes through the side of box B, and has attached to its outwardly-extending end an arm E, which is electrically connected with a magnetic circuit—as, for instance, with a wire $e$, as shown, leading to a battery N.

F and F' are stops placed in the path of arm E, being or containing conductors connected with the wire $f^3$, which forms part of the circuit of battery N, the connection being shown at $f$ and $f^2$.

G is an electro-magnet situated in the circuit of the battery and connected with wire $f^3$ at one end and at the opposite end with the wire $e'$, which leads from the opposite pole of the battery to that connected with wire $e$. The circuit is of course broken, except when the wires $e$ and $f^3$ are connected by arm E coming in contact with one of the stops F or F'.

H is a pipe leading from the boiler and into a valve-box I, with which pipe H connects at $i$, while a second pipe H' connects with the box at $i'$, and has a steam-whistle M secured upon its end.

J is a valve secured so as to normally close the passage through box I, and having a stem J' which extends out of the valve-box, and upon the end of which a lever K is arranged to act, said lever carrying at one end the armature L.

$k$ is the pivot of lever K.

In the described construction of the float-box connections the shaft $d'$, passing through the box, is actuated by the float, and in turn actuates the arm E to make contact with stops F F' and close the electric circuit, which, as already stated, remains open in the normal condition of the water in the boiler. I utilize the magnet to control the admission of steam to a steam-whistle connected with the boiler, and the best arrangement I have devised for this purpose is that illustrated, in which the conduit, made up of pipes H H', leads from the boiler upward to a steam-whistle, a valve-box I being inserted in it, and a valve J secured therein so as to normally close the conduit. If arranged as shown, the pressure of steam will close and keep closed the said valve; or a spring—such as $j$—may be used to hold it to its seat. The valve-stem J' extends out of the box, and a lever K is arranged so that one end will rest against said rod while the other end carries the armature L of the magnet. As will be at once seen, as soon as the circuit is closed by the contact of arm E with stop F or F' the armature L will be drawn down and the end of lever K will press on rod J' and open valve J, allowing the steam to flow to the whistle and give the alarm.

The special device used to connect the armature and valve can of course be varied, and the kind of valve is not an essential feature. For instance, such connections and valve may be used as are shown in my patent, No. 393,431, granted November 27, 1888.

Having now described my invention, what I claim as new, and desire to secure by Letters Patent, is—

The combination, with a steam-boiler, of a float-box connected with the water and steam space thereof, a lever situated in said float-box secured to a rotatable shaft at one end and having a float secured to its other end, the rotatable shaft, one end of which passes through and extends outside the float-box, an arm secured on the extension of said shaft and connected with an electro-magnetic circuit, stops placed in the path of said arm at the points indicating danger from low and high water, both connected with and situated in the circuit aforesaid, an electric circuit, an electro-magnet situated in said circuit, an armature, a steam-whistle, a conduit connecting said whistle with the boiler, a valve-box in said conduit, and a valve situated therein, and the mechanism connecting said valve with the armature of the magnet, so that it will be opened when the circuit is closed.

ALBERT C. GRIGGS.

Witnesses:
W. G. WHITELEY,
HENRY J. CRIPPEN.